(12) United States Patent
Ebert et al.

(10) Patent No.: US 11,719,289 B2
(45) Date of Patent: Aug. 8, 2023

(54) MULTI-CLUTCH ARRANGEMENT, DUAL-CLUTCH TRANSMISSION ARRANGEMENT AND MOTOR VEHICLE

(71) Applicant: ZF FRIEDRICHSHAFEN AG, Friedrichshafen (DE)

(72) Inventors: Angelika Ebert, Schonungen (DE); Steffen Matschas, Bad Bocklet (DE); Johannes Friess, Michelau im Steigerwald (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 261 days.

(21) Appl. No.: 16/604,318

(22) PCT Filed: Mar. 5, 2018

(86) PCT No.: PCT/EP2018/055255
§ 371 (c)(1),
(2) Date: Oct. 10, 2019

(87) PCT Pub. No.: WO2018/188855
PCT Pub. Date: Oct. 18, 2018

(65) Prior Publication Data
US 2020/0141453 A1    May 7, 2020

(30) Foreign Application Priority Data
Apr. 11, 2017    (DE) .................... 10 2017 206 215.0

(51) Int. Cl.
*F16D 21/06*    (2006.01)
*F16D 13/58*    (2006.01)
*F16D 25/0638*    (2006.01)
*F16D 25/10*    (2006.01)
*F16D 13/52*    (2006.01)

(52) U.S. Cl.
CPC ............. *F16D 21/06* (2013.01); *F16D 13/58* (2013.01); *F16D 25/0638* (2013.01); *F16D 25/10* (2013.01); *F16D 13/52* (2013.01); *F16D 2021/0661* (2013.01); *F16D 2300/22* (2013.01)

(58) Field of Classification Search
CPC .......... B60K 6/387; B60K 6/405; B60K 6/48; B60K 2006/268; B60K 2006/4825; F16D 25/0638; F16D 25/10; F16D 21/06; F16D 2021/0661; F16D 2300/22; F16D 2300/26
See application file for complete search history.

(56) References Cited

U.S. PATENT DOCUMENTS

| | | | | |
|---|---|---|---|---|
| 8,511,450 B2 * | 8/2013 | Gold | .................. | F16D 25/10 192/48.619 |
| 8,757,305 B2 * | 6/2014 | Roske | .................. | F16D 21/06 180/65.22 |

(Continued)

FOREIGN PATENT DOCUMENTS

| | | |
|---|---|---|
| DE | 102009059944 | 7/2010 |
| DE | 102014204970 | 4/2015 |

*Primary Examiner* — Richard M Lorence
(74) *Attorney, Agent, or Firm* — Cozen O'Connor

(57) ABSTRACT

A multi-clutch arrangement between a drive unit and a transmission having at least three multi-plate clutches. The multi-plate clutches include an outer plate carrier in each instance such that the outer plate carriers form the housing of a multi-clutch arrangement.

16 Claims, 2 Drawing Sheets

(56) References Cited

U.S. PATENT DOCUMENTS

| | | | |
|---|---|---|---|
| 2011/0259698 A1* | 10/2011 | Arnold | B60K 6/405 |
| | | | 192/48.1 |
| 2014/0113761 A1* | 4/2014 | Goleski | F16D 25/0638 |
| | | | 475/269 |
| 2020/0049208 A1* | 2/2020 | Ebert | F16D 25/0638 |

* cited by examiner

MULTI-CLUTCH ARRANGEMENT, DUAL-CLUTCH TRANSMISSION ARRANGEMENT AND MOTOR VEHICLE

CROSS REFERENCE TO RELATED APPLICATIONS

This is a U.S. national stage of Application No. PCT/EP2018/055255 filed Mar. 5, 2018. Priority is claimed on German Application No. DE 10 2017 206 215.0 filed Apr. 11, 2017 the content of which is incorporated herein by reference.

BACKGROUND OF THE INVENTION

1. Field of the Invention

The invention is directed to a multi-clutch arrangement arranged between a drive unit and a transmission, wherein the multi-clutch arrangement has at least three multi-plate clutches, and the multi-plate clutches comprise an outer plate carrier in each instance.

2. Description of the Prior Art

Triple clutch systems are used in hybridized dual clutch transmissions. One of the clutches is the disconnect clutch for decoupling the internal combustion engine from the rest of the drivetrain, and the other two clutches are power shift clutches. One of the power shift clutches is the starting clutch.

The arrangement of the three clutches is critical particularly in front transverse mount applications because the latter are usually constructed to be broad in axial length.

SUMMARY OF THE INVENTION

It is an object of one aspect of the present invention to provide a multi-clutch arrangement optimized with respect to installation space.

According to one aspect of the invention, outer plate carriers form the housing of the multi-clutch arrangement. This means that no component parts of the multi-clutch arrangement other than the outer plate carriers are used to form the housing. Accordingly, the housing component parts additionally utilized heretofore can be dispensed with so as to economize on installation space particularly in axial direction.

The multi-clutch arrangement can advantageously be formed as a preassembled module. Accordingly, the multi-clutch arrangement can be supplied as an individual package and the preassembled module can easily be fitted to the transmission input shafts and mounted in this manner during final assembly.

The outer plate carriers can preferably be connected so as to be fixed with respect to relative rotation. Further, two of the three outer plate carriers can be nondetachably connected to one another. For example, the outer plate carriers can be welded together or, alternatively, riveted together.

Further, two of the outer plate carriers can be connected to one another by positive engagement. It is important that they ultimately form a housing and are also capable of receiving the torque of the internal combustion engine.

One of the outer plate carriers can preferably be mounted at a hub. The hub is advantageously arranged on the drive side. The hub can preferably communicate with a torsional damper, particularly a dual mass flywheel.

Two outer plate carriers can advantageously be connectable or connected to a hub so as to be fixed with respect to rotation relative to it. This hub can advantageously be formed as an oil feed hub. An oil feed hub has channels for guiding oil. In particular, the outer plate carriers can be welded to the hub.

In an advantageous manner, two outer plate carriers can be arranged on the input side and one outer plate carrier can be arranged on the output side. The input-side outer plate carriers can be the outer plate carriers of the power shift clutches, and the output-side outer plate carrier can be the outer plate carrier of a disconnect clutch. As has already been described, the disconnect clutch serves to disconnect the internal combustion engine from the rest of the drivetrain to decouple the drag torque of the internal combustion engine in pure electric drive mode.

A mass damper can preferably be fastened to one of the outer plate carriers. The mass damper can preferably be configured as a speed-adaptive mass damper. Alternatively, the mass damper may be a fixed-frequency mass damper. Vibrations from the drivetrain may be damped by the latter. The mass damper can preferably be fastened to an output-side plate carrier. This is provided particularly when the output-side plate carrier, particularly output plate carrier, is the disconnect clutch.

This connection of the mass damper has the advantage that when starting the combustion engine through a conventional starter at the TD ring gear or a belt starter at the front of the engine, the mass damper is decoupled from the combustion engine through the open K0 such that the combustion engine does not experience any rotational acceleration through the dynamic running up of the combustion engine. This serves to protect structural component parts and reduces noise due to impacts of the flyweights in their end stops.

A sprocket wheel can advantageously be fastened to one of the outer plate carriers. The outer plate carrier can preferably be an outer plate carrier of a power shift clutch. The outer plate carrier can advantageously be an input-side plate carrier.

One of the actuation elements, particularly one of the pistons, can advantageously have openings for receiving an outer plate carrier. In particular, this can be the actuation element of the same multi-plate clutch.

The clutch arrangement can advantageously be a triple clutch arrangement. In principle, more clutches can also be contained. However, a triple clutch arrangement is preferred for hybridized dual clutch transmissions.

One aspect of the invention is additionally directed to a hybrid dual clutch transmission arrangement with a multi-clutch arrangement. The hybrid dual clutch transmission arrangement is characterized in that the multi-clutch arrangement is configured in the manner described above.

The hybrid dual clutch transmission arrangement can preferably have an axially parallel electric motor. This electric motor can be coupled to the clutch arrangement, for example, via a chain.

The hybrid dual clutch transmission arrangement is advantageously configured to be a countershaft-type hybrid dual clutch transmission arrangement. This means that the dual clutch transmission arrangement has at least one countershaft. The dual clutch transmission arrangement can advantageously have two countershafts.

One aspect of the invention is additionally directed to a motor vehicle having a multi-clutch arrangement and/or a dual clutch transmission arrangement. The motor vehicle is characterized in that the multi-clutch arrangement and/or the dual clutch transmission arrangement is configured in the manner described above.

BRIEF DESCRIPTION OF THE DRAWINGS

Further advantages, features and details are apparent from the following description of embodiment examples and figures. The drawings show.

DETAILED DESCRIPTION OF THE PRESENTLY PREFERRED EMBODIMENTS

Figure 1:
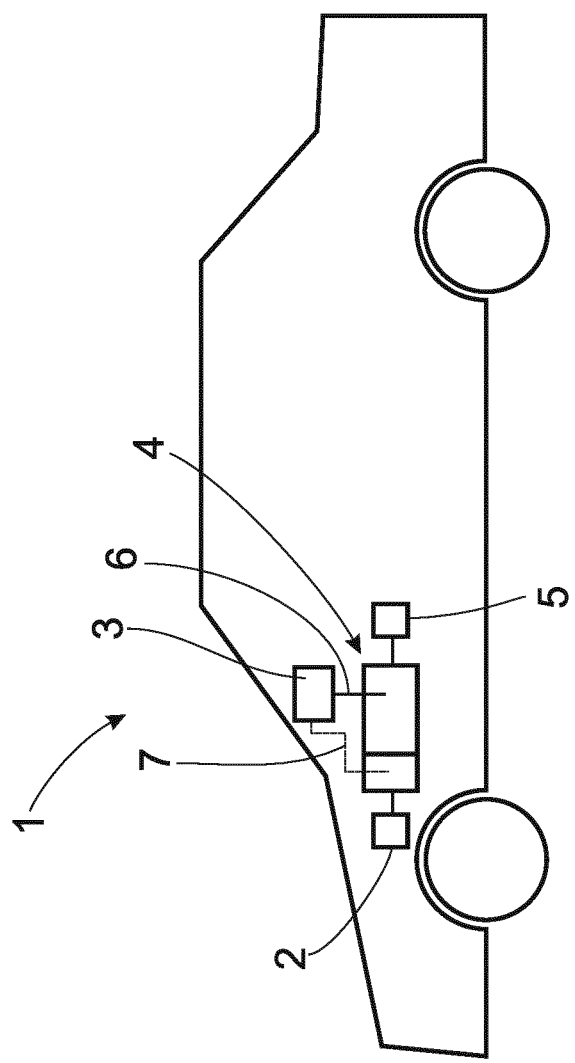
FIG. 1 is a motor vehicle.

FIG. 1 shows a motor vehicle 1 with a first drive unit 2, a second drive unit 3, a dual clutch transmission arrangement 4, and a differential 5. The first drive unit preferably comprises an internal combustion engine. The second drive unit 3, which is switched off particularly in the form of an electric motor, can act on the drivetrain either as indicated by line 6 or by dashed line 7. Cooperation with one or both transmission input shafts is designated as the P2 arrangement and a cooperation with the transmission itself is designated as the P3 arrangement. In addition, a P1 arrangement and a P4 arrangement are also known. These represent the basic variants of a parallel arrangement of first drive unit 2 and second drive unit 3. A clutch arrangement for a P2 arrangement is described in the following.

Figure 2:
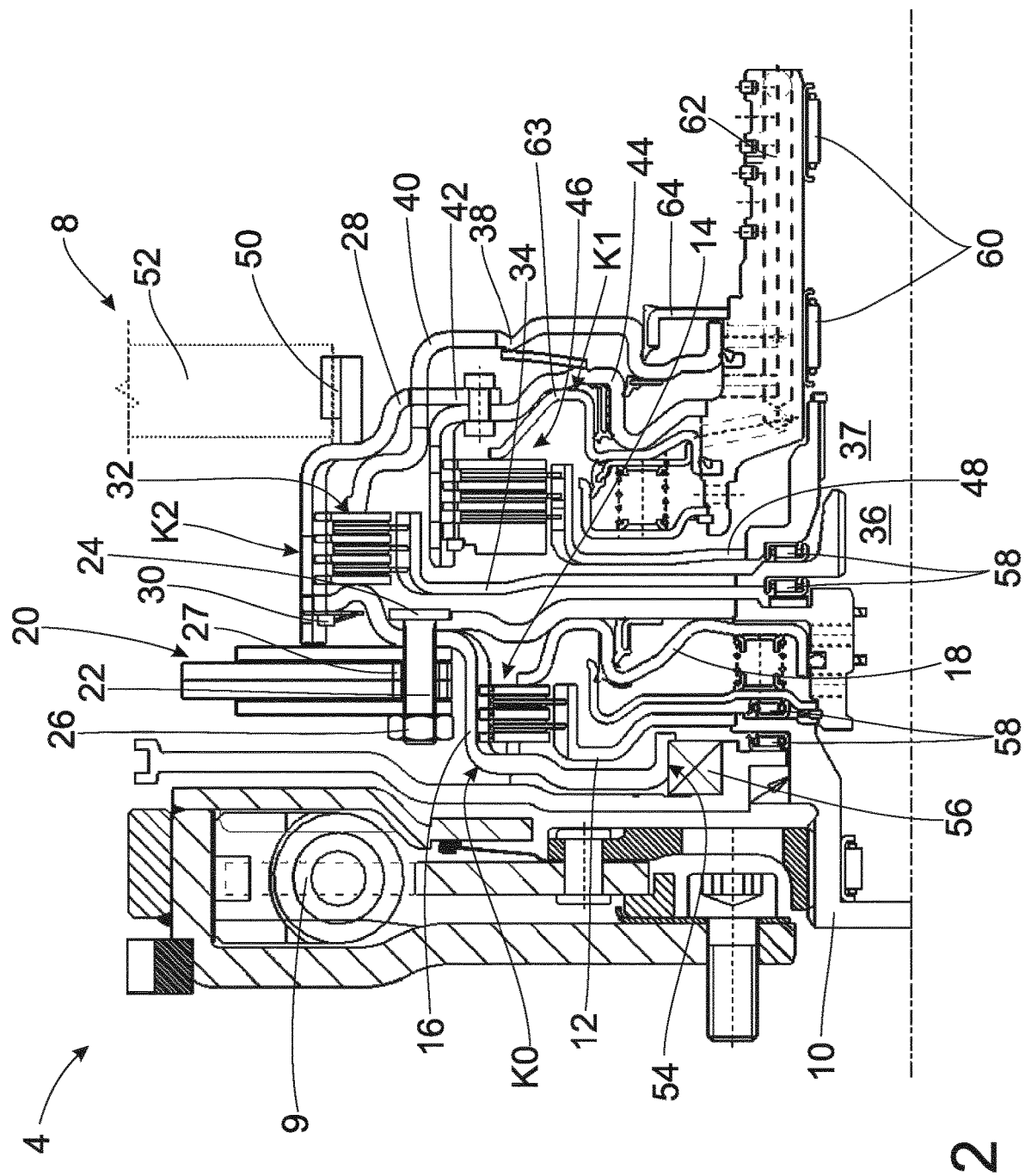
FIG. 2 is a clutch arrangement.

FIG. 2 shows a clutch arrangement 8 as part of the dual clutch transmission arrangement 4. The dual clutch transmission arrangement 4 is hybridized so that torque can reach the transmission via two paths. The first path leads from the first drive unit 2 via a torsional damper 9 for damping torsional vibrations and a hub 10 to the disconnect clutch K0. The input plate carrier of the disconnect clutch K0, namely, the inner plate carrier 12, is connected to hub 10 to be fixed with respect to rotation relative to it. The torque can be transmitted to the outer plate carrier 16 via lamination stack 14. A piston 18 is provided for actuating the disconnect clutch K0.

A speed-adaptive mass damper 20 is fastened on the output side of disconnect clutch K0, namely, to the output plate carrier, in this case, outer plate carrier 16. The speed-adaptive mass damper 20 is detachably connected to outer plate carrier 16. For example, mass damper 20 can be screwed to outer plate carrier 16 by a screw 22. In so doing, the screw head 24 is arranged inside of the clutch arrangement 8, while the nut 26 is arranged on the outside. A sleeve 27 is located between mass damper 20 and screw 26. The path plates of the mass damper 20 are spaced apart axially by this sleeve 27 when the screw assembly is closed.

Outer plate carrier 28 is connected to outer plate carrier 16 to be fixed with respect to rotation relative to it. For example, outer plate carrier 16 and outer plate carrier 28 can be connected by positive engagement. A snap ring 30 can be used to axially secure outer plate carrier 16 relative to outer plate carrier 18. Outer plate carrier 28 is the input plate carrier of clutch K2 which is formed as multi-plate clutch and constitutes one of the two power shift clutches of the dual clutch transmission arrangement 4. If disconnect clutch K0 is closed, the torque is transmitted via outer plate carrier 16, outer plate carrier 28 and lamination stack 32 of clutch K2 to the inner plate carrier 34 and, from the latter, to the radially inner transmission input shaft 36.

In order to connect outer plate carriers 16 and 28, mass damper 20 can be disassembled from outer plate carrier 16 to expose the interface.

Clutch K2 has piston 38 for actuation. Piston 38 has a plurality of openings 40 in the form of elongate holes that are distributed in circumferential direction and in which the outer plate carrier 28 can engage. More accurately, a plurality of fingers 42 of outer plate carrier 28 engage in the openings 40 of piston 38. Piston 38 accordingly remains axially displaceable relative to outer plate carrier 28.

Clutch K1, which is formed as a starting clutch, is located radially inside of clutch K2. Outer plate carrier 28 is connected to outer plate carrier 44 of clutch K1 so as to be fixed with respect to rotation relative to it. In particular, outer plate carriers 28 and 44 may be welded. Accordingly, the torque that is transmitted from the first drive unit 2 can also reach clutch K1. Outer plate carrier 44 is accordingly the input plate carrier of clutch K1. Torque can arrive at the radially outer transmission input shaft 37 via the lamination stack 46.

Openings 40 for receiving the fingers 42 are preferably arranged at the radially outer edge, also known as pot edge, of piston 38. Piston 38 has a pot shape. Fingers 42 of outer plate carrier 28 can be inserted at the outer edge of the base, for which reason the openings 40 are preferably located at the latter.

A sprocket wheel 50 can be fastened to the outer plate carrier 28. Sprocket wheel 50 can be welded to outer plate carrier 28, for example. This outer plate carrier 28 engages with a chain 52 that connects the electric motor 3 and clutch arrangement 8. Electric motor 3 acts on the input side of the two clutches K1 and K2, since output plate carrier 28 is the input plate carrier of clutch K2 on the one hand and is connected to outer plate carrier 44 of clutch K1 so as to be fixed with respect to rotation relative to it on the other hand. Outer plate carrier 44 of clutch K1 is also the input plate carrier. Accordingly, FIG. 2 shows a P2 arrangement with respect to the coupling of the electric motor 3.

As a result of the construction and connection of outer plate carriers 16, 28, and 44, the latter form the housing of clutch arrangement 8. Clutch arrangement 8 is a multi-clutch arrangement and, in particular, a triple clutch arrangement. Apart from outer plate carriers 16, 28, and 44, there are no further housing parts. This results in a construction that is optimized with respect to installation space.

Since mass damper 20 is detachably connected to outer plate carrier 16, the outer plate carriers 16 and 28 can be connected before mass damper 20 is connected to clutch arrangement 8.

The described construction with the outer plate carriers as housing also enables a simplified bearing support of clutch arrangement 8. In particular, clutch arrangement 8 can have only one radial bearing location 54 on the engine side. Bearing 56 can be formed as a radial ball bearing. This can preferably be a thrust and journal bearing. However, it is the sole bearing with a radial bearing function on the engine side.

Further, clutch arrangement 8 has two thrust bearings 58 on the engine side and transmission side, respectively. Thrust bearings 58 serve for axial bearing support of inner plate carriers 12, 34, and 48. Accordingly, they are arranged at the bases of inner plate carriers 12, 34, and 48. On the transmission side, clutch arrangement 8 has two needle bearings 60 for radial bearing support, these two needle bearings 60 supporting hub 62. Hub 62 is formed as an oil feed hub. It accordingly comprises oil channels and seals. Hub 62 is connected to outer plate carrier 44 so as to be fixed with respect to rotation relative to it. However, the torque flow is not carried out as in known dual clutch arrangements via the hub to the outer plate carrier. On the contrary, the torque comes from the outer plate carrier, more accurately from outer plate carrier 28, via outer plate carrier 44 to hub 62.

Piston 63 of clutch K1 is likewise supported on hub 62. The seal carrier 64 for sealing the pressure space of clutch K2 is arranged at hub 62.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A multi-clutch arrangement configured to be arranged between a drive unit and a transmission, comprising:
    at least three multi-plate clutches, each multi-plate clutch comprises a respective outer plate carrier, wherein one of the at least three multi-plate clutches is a disconnect clutch; and
    a connector configured to axially parallel connect an electric motor is arranged on at least one outer plate carrier of one of the multi-plate clutches other than the disconnect clutch,
    wherein the respective outer plate carriers form a housing of the multi-clutch arrangement.

2. The multi-clutch arrangement according to claim 1, wherein the multi-clutch arrangement is a preassembled module.

3. The multi-clutch arrangement according to claim 1, wherein the respective outer plate carriers are connected to be fixed with respect to relative rotation.

4. The multi-clutch arrangement according to claim 1, wherein one of the outer plate carriers is mounted at a hub.

5. The multi-clutch arrangement according to claim 1, wherein two outer plate carriers are at least one of:
    configured to be connected to a hub to be fixed with respect to rotation relative to the hub and
    connected to the hub to be fixed with respect to rotation relative to the hub.

6. The multi-clutch arrangement according to claim 5, wherein a speed-adaptive mass damper is fastened to one of the outer plate carriers.

7. The multi-clutch arrangement according to claim 1, wherein two of the outer plate carriers are arranged on an input side and one outer plate carrier is arranged on an output side.

8. The multi-clutch arrangement according to claim 7, wherein a speed-adaptive mass damper is fastened to one of the outer plate carriers.

9. The multi-clutch arrangement according to claim 1, wherein one of the at least three multi-plate clutches is a starter clutch.

10. The multi-clutch arrangement according to claim 1, further comprising:
    at least one actuation element,
    wherein the at least one actuation element has at least one opening configured to receive an outer plate carrier.

11. The multi-clutch arrangement according to claim 10, wherein the at least one actuation element is a piston.

12. The multi-clutch arrangement according to claim 1,
    wherein one of the outer plate carriers, configured as a radially outer plate carrier, is fastened to another of the outer plate carriers, configured as a radially inner outer plate carrier,
    wherein the fastening is by one of positive engagement, frictional engagement, and bonding engagement.

13. The multi-clutch arrangement according to claim 1, wherein the multi-clutch arrangement is a triple clutch arrangement.

14. The multi-clutch arrangement according to claim 1,
    wherein the disconnect clutch is arranged at a first axial end of the multi-clutch arrangement and the multi-plate clutches other than the disconnect clutch are arranged at a second axial end of the multi-clutch arrangement,
    wherein the connector is arranged at the second axial end of the multi-clutch arrangement.

15. A hybrid dual clutch transmission arrangement comprising:
    a multi-clutch arrangement, wherein the multi-clutch arrangement is configured to be arranged between a drive unit and a transmission, and comprising:
        at least three multi-plate clutches, each multi-plate clutch comprises a respective outer plate carrier, wherein one of the at least three multi-plate clutches is a disconnect clutch; and
        a connector configured to axially parallel connect an electric motor is arranged on at least one outer plate carrier of one of the multi-plate clutches other than the disconnect clutch,
        wherein the respective outer plate carriers form a housing of the multi-clutch arrangement.

16. A motor vehicle comprising:
    a drive unit;
    a transmission; and
    at least one of:
    a multi-clutch arrangement and
    a dual clutch transmission arrangement comprising the multi-clutch arrangement,
    wherein the multi-clutch arrangement is arranged between the drive unit and the transmission, and comprising:
    at least three multi-plate clutches, each multi-plate clutch comprises a respective outer plate carrier, wherein one of the at least three multi-plate clutches is a disconnect clutch; and
    a connector configured to axially parallel connect an electric motor is arranged on at least one outer plate carrier of one of the multi-plate clutches other than the disconnect clutch,
    wherein the respective outer plate carriers form a housing of the multi-clutch arrangement.

\* \* \* \* \*